May 26, 1936.   R. H. DUCEY   2,042,213
UNIVERSAL TOOL FOR GAUGING AND MEASURING
Filed Nov. 25, 1933
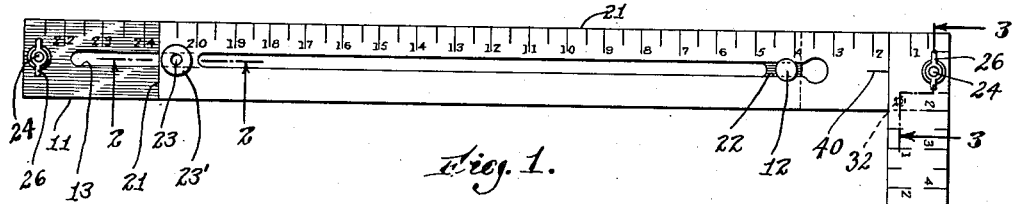
Inventor
Roger H. Ducey
by [signature]
Attorney

Patented May 26, 1936

2,042,213

UNITED STATES PATENT OFFICE 2,042,213

UNIVERSAL TOOL FOR GAUGING AND MEASURING

Roger H. Ducey, Belmont, Mass., assignor to Joseph D. Knight, Reading, Mass.

Application November 25, 1933, Serial No. 699,729

7 Claims. (Cl. 33—98)

This invention relates to improvements in universal tool for gauging and measuring.

It provides a multi-use tool which can perform a variety of functions heretofore requiring use of a number of separate tools. The tool has a main or body portion which is extensible endwise, at whose ends are combined elements adjustable for defining different shapes and sizes, registering dimensions, measuring edges for ruling lines,—as on wood, sheet metal, cloth, paper or other stock,—such as lines for cutting or folding that stock, or to locate points thereon, or to mark angles where other parts should fit. For example, for making a threshold to fit a particular door casing, the invention provides for quickly and accurately determining all of the necessary dimensions, where the door casing has standing faces of various widths, rebated to various distances, and for marking the appropriate lines on stock which is to be cut to make the threshold.

It is an object of the invention to provide a body straight edge rule which, expansible endwise, as inside calipers, has provision for mounting other elements in coordinated relation at its ends.

Another object is to provide an effective simple means for positioning an element on a center near the end of the rule in exact right angular relation to the straight edge thereof, and locking it so. But the center is also adapted for the permitting of rotation of elements on the said center, with provision for the securing of such pieces in any of various positions of adjustment.

The same center combines with other elements to produce a holding means and a two-dimensional adjustment for gauge pieces on the end of the body or main base strip. Other important features are that the combination tool of the invention may be produced at small cost compared with any set of tools now available and capable of performing all of the same functions; and that the whole can be assembled, in knocked-down state, into a very small package for convenience in transportation for use, as in a carpenter's kit, or for shipping or storage when new.

To attain the mentioned objects and results the invention employs two superimposed base strips of similar dimension, associated together so as to permit of endwise movement of one over the other, guided so as to be only a longitudinal movement, with means for clamping these strips in any of various degrees of projection of one beyond the other. These two strips, suitably graduated, may function in an ordinary way, as inside calipers, according to well-known principles, as well as constituting a straight edge and a measuring rule, and also serving in connection with the elements associated at their ends.

At their ends the straight edge measuring rule and caliper base strips carry blades, which preferably are separable from each other and from the base, designed to cooperate with the base strip, and with other separable pieces, if present, for the accomplishment of one or more special functions in the general nature of measuring, gauging, defining or computing. In one setting of the tool, for example, gauge pieces will be mounted on one or both ends of the base strips, with provision for adjustment of each gauge in one or more dimensions on the base strips, for conforming to and thereby registering, and for generating or reproducing the configuration and exact dimensions which an object, for example, a threshold, must attain in order to fit the particular place, for example, a door casing.

For other purposes the blade pivoted at the end may be a combined ruling blade and protractor cooperating with the main straight edge to define a particular bevel. The other end of the extensible base strip may carry a blade or blades capable of a variety of settings for cooperating suitably with those mentioned at the first mentioned end.

It is intended that the patent shall cover by suitable expression in the appended claims whatever features of patentable novelty exist in the invention herewith disclosed.

An illustrative embodiment of the invention is shown in the accompanying drawing in which:

Figure 1 is a plan of adjustable graduated base strips having at one end a graduated straight-edge blade automatically secured in exact right angular relation to the base strips, detachable, but locked;

Figure 2 is a fragmentary elevation, enlarged and in section on 2—2 of Figure 1;

Figure 3 is a fragmentary elevation, enlarged, in section on 3—3 of Figure 1;

Figure 4 is an elevation of the complete device of Figure 1;

Figure 5 is a plan of adjustable, graduated base strips with a different tool element mounted at each end, each in co-acting association with the base strips;

Figure 6 shows, in plan, a set of gauges on each end of the base strips;

Figure 7 is an enlarged plan of the right hand end of Figure 6 in section at the top surface of the element 48;

Figure 8 is an enlarged fragmentary elevation, in section on 8—8 of Figure 6; and Figure 9 is an enlarged plan of the right hand end of Figure 6 in section at the top surface of the element 50.

In the drawing, particular attention is directed to the extensible character of the main body two-strip portion 11, 21, wherein the thin strip 11 is slidably adjustable endwise with respect to the thin strip 21, these two being secured together by a pin 12, set in the strip 11 and passing loosely through the longitudinal slot 22 in the middle of the strip 21, which pin is headed over so as to hold the strips 11 and 21 permanently together as parts of a single extensible rule or measure. This measure may be graduated with a scale as an interior calipers for showing the distance between two bodies. The provision of only two such parts 11 and 21 is sufficient and is convenient for most purposes, but the tool can be made with one or more similar sections, additional to these, if desired. The member 21 may, for convenience, be referred to as a "base member" from which the member 11 can be projected. The headed pin 12 is at the inner end of the projectile outward sliding member 11; and there is at the outward end of the base strip 21, a corresponding pin or bolt 23, which also constitutes a screw clamp, whose head engages under the strip 11, and which has in the zone of that piece 11 a block portion 13', seen in Figure 2, rigid on the bolt, which rides non-rotatably in the slot 13 thereof. The screw nut 23' therefore can clamp the parts 11 and 21 together in any position in which they have been adjusted by the sliding of the pins in their respective slots. These strips can be separated by moving the screw 23' and by then passing the head of the pin 12 through the enlarged end portion of the slot 22.

At the outer end of each of the strips 11, 21, a screw stud 24 projects upward from the broad graduated face of the strip, and a thumb nut 26 is provided for each. The screws may be loose in their respective strips, but preferably each will be rigid with its strip to minimize danger of loss or misplacement of a screw, and also to facilitate the attachment and substitution of auxiliary tool elements for co-acting with the strips 11, 21 and with each other.

One such auxiliary element is represented in Figure 1, mounted on base strip 21. This is a graduated straight-edged blade 28 pierced by a hole 30 near one end, for reception of the stud 24 on the strip 21. The under face of this blade 28 is adapted to rest flat on the top face of the base strip 21, and it carries a fixed projecting pin 32. A hole 34 in the strip 21 is located so as to register with this pin when the blade 28 is set at exactly a right angle to the base strip 21. Thumb nut 26 threaded on the screw 24 can be tightened to clamp this blade and base together, and the blade and base are then locked by pin 32 against displacement from their right angular relation. The position of this blade this side up, pin down, makes it automatically a square as well as a measuring rule and inside calipers. This blade 28 can be set the other side up, and may then be adjusted to any angle, as is illustrated in Figure 5 with a blade having a slightly different shape of its base end, which is arcuate.

In Figure 5 an auxiliary tool element is shown at each end of the calipers or strips 11, 21. At the right hand end it is a straight-edge blade 36 having an arcuate end 38 with radial graduations, and with a central hole for reception of a stud 24. Preferably the circle of end 38 will be tangential to one of the straight edges of blade 36. The graduations constitute the end portion of this blade a protractor, for co-acting with a fixed zero point or mark 40 on the base strip 21, thereby to provide for setting blade 36 at various angles with respect to the base strip. It is a convenient tool for determining and marking bevels, etc. Comparing this with Figures 1–4, it will be understood that the basal end of blade 28 might be shaped arcuate like the basal end of blade 36, and might carry the protractor scale on its face which is underneath in the present drawing, the pin 32 on that face being also present. By merely turning over this loose blade and securing it by the screw 26 it can be made either a bevel or an automatically correct square.

The other end of the base strips also carries a straight-edge blade, as at 42, which may be longitudinally slotted as at 44, like an ordinary bevel, and which may have an oblique free end 46. In this case the slot 44 receives a screw 24, and the thumb nut 26 is effective for clamping the blade in any of a multiplicity of settings.

Figures 6–8 illustrate the invention arranged for measuring and gauging the irregular surfaces of a door or window casing. For example, preliminarily to the marking of stock for the cutting of a threshold, the pattern and all measurements including rebates may be quickly and accurately determined. For this, as many gauge elements 48, 50, 52 as may be needed are provided at each end of the calipers. These gauges are stacked flatwise one upon the other, at each end, and are individually of such sizes and shapes as will serve the purpose, each stack being threaded on a stud 24, to be held in set positions by a thumb nut 26. The groups of three here represented are sufficient for ordinary door and window casings.

These gauges 50, 52 may be substantially of L-shape, with the under one 52 having its base leg longest and also with its L projecting out beyond those of others, only one other with an L being shown in each stock. The L is for registering the position and depth of a rebate or rabbet in the casing. Both gauges 50, 52 have large holes, as at 50', 52', where the stud 24 passes through, so that each may be adjusted in various directions and distances from the base strip 21, each gauge independently of each other gauge. The smaller gauge 48 can be adjusted for an oblique surface at the end of the base strip, its large hole 48' being the equivalent of a slot extending in all directions, permitting a variety of angular settings.

The stack of gauges, or any individuals of it, can be mounted on the same stud with the blade 36 or 26 or a blade which combines in itself the qualities of 36 and 26 as above explained. Hence in using the tool for work where a long lateral of 90° or other angle is wanted, the position and bearing of surrounding surfaces or important lines can simultaneously be registered, and preserved for use by a rigid clamping of the stud screws 26, for the marking or cutting out of stock, or for other uses. And various other combinations of the auxiliary tool elements may be made, as by mounting a set of the gauges of Figure 6 at the left hand end of the device of Figure 1, or by substituting these gauges for one of the blades of Figure 5; or one of the blades of Figure 5 might be mounted on the left hand end of the square of Figure 1.

The top plate in a stack of the gauge elements constitutes a presser plate for transmitting the clamping pressure to the underlying elements. In Figures 5 and 6 the smaller gauge element 48 serves as the presser plate. Its slot 48' permits adjustment of the plate around the stud 24, and also permits adjustment to set its main straight edge nearer to or further from the stud. Meanwhile the underneath gauge plates are each adjustable to an extensive distance in any direction because of the large opening in each through which the stud passes. But in any of the possible settings of plate 48, and of the plates underneath, the plate 48 covers the large openings in the under plates, and tightening of the clamp effects a broad basal pressing together of the gauge elements.

I claim as my invention:

1. In a tool, the combination of an inside caliper with a terminal gauge element, and clamping means therefor; said gauge being a flat plate of substantially L-shape; said clamping means comprising a stud fixed on and projecting at one face of the caliper; and said gauge element having in its basal portion an extensive opening through which said stud extends; said opening, at every location across it, having breadth dimension considerably greater than the diameter of said stud, thereby permitting its positional adjustment in all directions for straight-line adjustment of the gauge element in any compass direction with respect to the caliper.

2. In a tool, the combination of inside calipers with terminal gauge elements; a plurality of said gauge elements being mounted at an end of the calipers, the gauge elements being superposed on each other and on the end portion of the caliper, and extending laterally from the calipers and being mounted thereon each individually adjustable both along and across the calipers; and a single clamp for securing all of said gauge elements on the calipers in selected relative positions of adjustment; the said superposed gauges having diverse configurations for engaging adjacent surfaces which may be diversely rebated with respect to a surface with which an end of the calipers may be engaged.

3. A tool having a plurality of graduated base members which are adjustable longitudinally with respect to each other, with means for clamping them together in selected positions of adjustment; combined with a plurality of auxiliary tool elements for each free end of the said base members; there being fixed in position at each said free end of a base member a clamping means including a screw; and a plurality of said auxiliary tool elements at each said free end of a base member, having each a large area of opening through which said screw extends; said opening, at every location across it, having breadth dimension greatly exceeding the diameter of said screw, the difference by which it exceeds said diameter being space permitting its positional adjustment in all directions; said auxiliary tool elements being superposable and interchangeable on the base members, and being adapted to cooperate with said members to register simultaneously with the relative locations of a plurality of surfaces of an object.

4. A tool having a plurality of interlocked, flat base strips, relatively slidable in longitudinal direction, and means for securing them together; a stud with clamping screw at the free end of one of said base strips; and a plurality of flat blades superposable on that end, each having a basal opening for being strung on and adjusted to various degrees of projection from the said stud; said blades having rectilinear edges, and said clamping screw adapted to fasten a group of the blades in positions individually adjusted relative to each other and to the base strips.

5. In a tool, the combination of an inside caliper with a plurality of gauge elements, and clamping means therefor; said clamping means comprising a stud projecting at the terminal part of one face of the caliper, with thumb nut threaded thereon; and said gauge elements each having a basal adjustment-opening through which said stud extends, the basal opening of the topmost gauge element being in slot form, narrow to fit the stud and long for adjustment; and the basal openings of gauge elements underneath it being in broad hole form, each approximating an equality of diameter of opening in all directions, affording adjustment in all directions from one position to a parallel position, for which broad holes the said element having the slot provides a cover plate adapted to be directly engaged by the said thumb nut and constituting thereby a presser plate for securing the underlying gauge elements.

6. In a tool, the combination of inside calipers with terminal gauges, and a single clamp for securing all of said gauge elements on the calipers in selected relative positions; the said gauge elements having length extending in laterally projecting relation to the calipers, and each having an L at a laterally projected position, for gauging surfaces standing laterally beside and rebated from a surface engaged by an end of the calipers; and said clamp being engageable with all of said gauges simultaneously, for clamping them in adjusted relative positions.

7. A tool comprising a straight-edge measuring rule and a straight-edge blade mountable thereon, each of these elements having a fixed stud projecting from its face which is toward the other of these elements, and each having a hole spaced from its said stud and located for receiving the projecting stud of the other element; the said stud of each said element having configuration for close fit in said hole of the other element; and one of said studs having a threaded part, projecting beyond the other element, when it is fitted therein; and a nut, with clamping face for engaging the remote face of the said other element; said nut being effective for securing both of said blades in a relation predetermined by the relations of the said studs and holes.

ROGER H. DUCEY.